(12) United States Patent
Fong et al.

(10) Patent No.: US 8,811,339 B2
(45) Date of Patent: Aug. 19, 2014

(54) HANDOVER SCHEMES FOR WIRELESS SYSTEMS

(75) Inventors: Mo-Han Fong, Ottawa (CA); Hang Zhang, Nepean (CA); Sophie Vrzic, Nepean (CA); Robert Novak, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 650 days.

(21) Appl. No.: 12/806,185

(22) Filed: Jul. 6, 2009

(65) Prior Publication Data

US 2011/0149904 A1 Jun. 23, 2011

Related U.S. Application Data

(60) Provisional application No. 61/078,505, filed on Jul. 7, 2008.

(51) Int. Cl.
*H04W 36/00* (2009.01)

(52) U.S. Cl.
USPC .......................................................... 370/331

(58) Field of Classification Search
USPC .......... 370/445, 328, 331, 332, 338; 455/437, 455/439, 442
See application file for complete search history.

(56) References Cited

U.S. PATENT DOCUMENTS

| | | | |
|---|---|---|---|
| 4,346,470 A | 8/1982 | Alvarez et al. | |
| 4,675,863 A | 6/1987 | Paneth et al. | |
| 4,817,089 A | 3/1989 | Paneth et al. | |
| 4,912,705 A | 3/1990 | Paneth et al. | |
| 5,022,024 A | 6/1991 | Paneth et al. | |
| 5,119,375 A | 6/1992 | Paneth et al. | |
| 5,121,391 A | 6/1992 | Paneth et al. | |
| 5,657,358 A | 8/1997 | Paneth et al. | |
| 5,687,194 A | 11/1997 | Paneth et al. | |
| 5,734,678 A | 3/1998 | Paneth et al. | |
| 5,867,478 A | 2/1999 | Baum et al. | |

(Continued)

FOREIGN PATENT DOCUMENTS

CA 2554778 A1 9/2005
CA 2603148 A1 10/2006

(Continued)

OTHER PUBLICATIONS

IEEE 802.16-2004.

(Continued)

*Primary Examiner* — Thai Nguyen
(74) *Attorney, Agent, or Firm* — Fish & Richardson P.C.

(57) ABSTRACT

One method of wireless communication involves acknowledging that an anchor base station received a handover indication signal. Another method involves: receiving, from base stations of an active set, offset signals identifying a respective differences in time between a reference time and respective times when the base station received a ranging signal from a mobile station; and transmitting, to the mobile station, a ranging control signal in response to the respective offset signals. Another method involves transmitting, to a mobile station in response to an active set signal, a system configuration information signal including system configuration information of a base station in an active set. Another method involves determining an uplink control channel power parameter in response to channel condition signals received from base stations in an active set. Another method involves transmitting a control signal to base stations in an active set on respective control channels. Apparatuses are also disclosed.

18 Claims, 14 Drawing Sheets

(56) References Cited

U.S. PATENT DOCUMENTS

| | | | |
|---|---|---|---|
| 5,887,261 A | 3/1999 | Csapo et al. | |
| 6,014,374 A | 1/2000 | Paneth et al. | |
| 6,282,180 B1 | 8/2001 | Paneth et al. | |
| 6,298,035 B1 | 10/2001 | Heiskala | |
| 6,353,602 B1* | 3/2002 | Cheng et al. | 370/332 |
| 6,359,938 B1 | 3/2002 | Keevill et al. | |
| 6,393,002 B1 | 5/2002 | Paneth et al. | |
| 6,473,393 B1 | 10/2002 | Ariyavisitakul et al. | |
| 6,654,429 B1 | 11/2003 | Li | |
| 6,771,667 B2 | 8/2004 | Paneth et al. | |
| 6,842,440 B2 | 1/2005 | Paneth et al. | |
| 6,954,470 B2 | 10/2005 | Paneth et al. | |
| 6,954,481 B1 | 10/2005 | Laroia et al. | |
| 7,012,882 B2 | 3/2006 | Wang et al. | |
| 7,020,701 B1 | 3/2006 | Gelvin et al. | |
| 7,145,940 B2 | 12/2006 | Gore et al. | |
| 7,248,559 B2 | 7/2007 | Ma et al. | |
| 7,460,466 B2 | 12/2008 | Lee et al. | |
| 7,545,734 B2 | 6/2009 | Ma et al. | |
| 7,551,546 B2 | 6/2009 | Ma et al. | |
| 7,844,687 B1 | 11/2010 | Gelvin et al. | |
| 7,995,454 B2 | 8/2011 | Geile et al. | |
| 8,140,658 B1 | 3/2012 | Gelvin et al. | |
| 8,169,977 B2* | 5/2012 | Laroia et al. | 370/335 |
| 2002/0003774 A1 | 1/2002 | Wang et al. | |
| 2002/0034213 A1 | 3/2002 | Wang et al. | |
| 2002/0080887 A1 | 6/2002 | Jeong et al. | |
| 2002/0122383 A1 | 9/2002 | Wu et al. | |
| 2002/0144294 A1 | 10/2002 | Rabinowitz et al. | |
| 2002/0181390 A1 | 12/2002 | Mody et al. | |
| 2003/0016621 A1 | 1/2003 | Li | |
| 2003/0072254 A1 | 4/2003 | Ma et al. | |
| 2003/0072255 A1 | 4/2003 | Ma et al. | |
| 2004/0081112 A1 | 4/2004 | Chen et al. | |
| 2004/0181800 A1 | 9/2004 | Rakib et al. | |
| 2004/0198467 A1 | 10/2004 | Orlik et al. | |
| 2005/0031047 A1 | 2/2005 | Maltsev et al. | |
| 2005/0083888 A1* | 4/2005 | Smee et al. | 370/332 |
| 2005/0282547 A1* | 12/2005 | Kim et al. | 455/436 |
| 2007/0053282 A1 | 3/2007 | Tong et al. | |
| 2007/0097945 A1* | 5/2007 | Wang et al. | 370/349 |
| 2008/0037669 A1 | 2/2008 | Pan et al. | |
| 2008/0056119 A1 | 3/2008 | Dapper et al. | |
| 2008/0080459 A1 | 4/2008 | Kotecha et al. | |
| 2008/0125128 A1 | 5/2008 | Yoo et al. | |
| 2008/0139207 A1 | 6/2008 | Son et al. | |
| 2008/0225690 A1 | 9/2008 | Dapper et al. | |
| 2008/0225691 A1 | 9/2008 | Dapper et al. | |
| 2008/0242340 A1* | 10/2008 | Kang et al. | 455/525 |
| 2008/0268833 A1* | 10/2008 | Huang et al. | 455/425 |
| 2008/0291875 A1* | 11/2008 | Kang et al. | 370/331 |
| 2008/0305745 A1 | 12/2008 | Zhang et al. | |
| 2009/0067534 A1 | 3/2009 | Kwak et al. | |
| 2009/0104909 A1 | 4/2009 | Vesely et al. | |
| 2009/0161591 A1 | 6/2009 | Ahmadi et al. | |
| 2009/0238303 A1 | 9/2009 | Mondal et al. | |
| 2009/0292570 A1 | 11/2009 | Fawls et al. | |
| 2011/0080893 A1 | 4/2011 | Fong et al. | |
| 2011/0242963 A1 | 10/2011 | Dapper et al. | |

FOREIGN PATENT DOCUMENTS

| | | |
|---|---|---|
| EP | 0415810 A1 | 3/1991 |
| EP | 1039684 | 9/2000 |
| EP | 2061173 A1 | 5/2009 |
| WO | 94/11957 A1 | 5/1994 |
| WO | 03/084092 A2 | 10/2003 |
| WO | 2007/053954 A1 | 5/2007 |
| WO | 2008/021062 A1 | 2/2008 |
| WO | 2008/075843 A1 | 6/2008 |
| WO | 2009/002097 A1 | 12/2008 |
| WO | 2009137295 | 11/2009 |
| WO | 2009141490 | 11/2009 |
| WO | 2010002219 | 1/2010 |

OTHER PUBLICATIONS

Draft IEEE 802.16m System Description Document, IEEE 802.16m-08/003r1, dated Apr. 15, 2008.
IEEE 802.16e-2005.
IEEE802.16-2009.
Report ITU-R M.2072.
Hunziker et al.; "Feedback-Aided Selective Subspace Retransmission for Outage-Free Spatial Multiplexing"; Information, Communications & Signal Processing; 2007 6th International Conference Feb. 12, 2008.
Islam et al.; "Space-Time Block Coding in MIMO Cognitive Networks with Known Channel Correlations"; Wireless Technology, 2008; EuWiT 2008 European Conference Jan. 19, 2009.
PCT/CA2010/001046 "International Search Report" dated Dec. 30, 2010, 3 pages.
PCT/CA2010/001046 "Written Opinion" dated Dec. 30, 2010, 6 pages.
Mohammad Ali Maddah-Ali et al.; "Communication Over MIMO X Channels: Interference Alignment, Decomposition, and Performance Analysis"; IEEE Transactions on Information Theory, vol. 54, No. 8, Aug. 2008, 3457-3470.
Charan Langton; Intuitive Guide to Principles of Communications: Orthogonal Frequency Division Multiplex (OFDM) Tutorial; www.complextoreal.com; 2004.
3GPP TSG-RAN Working Group 1 Meeting 54b, Prague, Czech Republic, Sep. 29-Oct. 3, 2008.
Wikipedia "Orthogonal frequency-division multiple access" Jun. 21, 2010.
Wikipedia "Orthogonal frequency-division multiplexing" Jun. 22, 2010.
Office Action from corresponding U.S. Appl. No. 12/806,184 issued on Apr. 21, 2011, 9 pages.
International Search Report and Written Opinion of corresponding PCT/CA2010/001530 dated Feb. 2, 2011, 12 pages.
International Search Report and Written Opinion of corresponding PCT/CA2010/001046 dated Dec. 30, 2010, 9 pages.
International Search Report and Written Opinion of corresponding PCT/CA2010/001529 dated Jan. 27, 2011, 12 pages.
International Search Report and Written Opinion of corresponding PCT/CA2010/001042 dated Sep. 17, 2010, 9 pages.
International Search Report and Written Opinion of corresponding PCT/CA2010/001045 dated Nov. 15, 2010, 10 pages.
Office Action for related U.S. Appl. No. 12/589,547, Oct. 7, 2011, 9 pages.
Notice of Allowance issued in U.S. Appl. No. 12/801,978 on Jul. 18, 2012; 9 pages.
U.S. Appl. No. 12/830,909, filed Jul. 6, 2010, Vrzic.
Office Action issued in U.S. Appl. No. 13/619,762 on Aug. 21, 2013, 15 pages.
EN 300 744 V1.1.2; "Digital Video Broadcasting (DVB); Framing Structure, Channel Coding and Modulation for Digital Terrestrial Television"; Aug. 1997.
Fernandez-Getina Garcia, M. Julia et al.; Efficient Pilot Patterns for Channel Estimation in OFDM Systems over HF Channels; pp. 2193-2197, Sep. 1999.
Jones, V.K.; Raleigh, Gregory C.; "Channel Estimation for Wireless OFDM Systems"; pp. 980-985, Nov. 1998.
Hutter et al.; "On the Impact of Channel Estimation for Multiple Antenna Diversity Reception in Mobile OFDM Systems"; Conference Record of the Thirty-Fourth Asilomar Conference on Signals, Systems and Computers; Oct. 29-Nov. 1, 2000; pp. 1820-1824.
Mincai, Qui; Wenyi, Guo; "The Theories of W-CDMA and CDMA2000 in the Third Mobile Communications System and the Draft for Implementation (II)"; Modern Science & Technology of Telecommunications; No. 11; pp. 24-26; Nov. 2000.
Raleigh et al.; "Multivariate Modulation and Coding for Wirelss Communication"; IEEE Journal on Selected Areas in Communications; vol. 17, No. 5; May 1999; 16 pages.
Specification of U.S. Appl. No. 12/468,628, filed May 12, 2009.
Office Action issued in U.S. Appl. No. 10/038,883 on Nov. 1, 2005; 17 pages.

(56) References Cited

OTHER PUBLICATIONS

Office Action issued in U.S. Appl. No. 10/038,883 on Nov. 3, 2006; 16 pages.
Notice of Allowance issued in U.S. Appl. No. 10/038,883 on Mar. 7, 2007; 6 pages.
Notice of Allowance issued in U.S. Appl. No. 10/038,883 on Jun. 5, 2007; 6 pages.
Office Action issued in U.S. Appl. No. 11/819,690 on Oct. 1, 2007; 10 pages.
Office Action issued in U.S. Appl. No. 11/819,690 on Apr. 30, 2008; 11 pages.
Advisory Action issued in U.S. Appl. No. 11/819,690 on Jul. 25, 2005; 3 pages.
Notice of Allowance issued in U.S. Appl. No. 11/819,690 on Feb. 5, 2009; 6 pages.
Notice of Allowance issued in U.S. Appl. No. 11/529,246 on Apr. 7, 2010; 10 pages.
Notice of Allowance issued in U.S. Appl. No. 12/830,791 on Jan. 3, 2011; 8 pages.
Office Action issued in U.S. Appl. No. 12/468,624 on Oct. 5, 2011; 10 pages.
Office Action issued in U.S. Appl. No. 12/468,624 on Mar. 23, 2012; 11 pages.
Notice of Allowance issued in U.S. Appl. No. 12/468,624 on Jul. 20, 2012; 5 pages.
Notice of Allowance issued in U.S. Appl. No. 13/108,443 on Jul. 17, 2012; 9 pages.
Notice of Allowance issued in U.S. Appl. No. 13/108,443 on Oct. 24, 2012; 9 pages.
Office Action issued in U.S. Appl. No. 13/586,660 on Dec. 7, 2012; 5 pages.
Notice of Allowance issued in U.S. Appl. No. 13/586,660 on Jan. 31, 2013; 6 pages.
Notice of Allowance issued in U.S. Appl. No. 13/586,660 on Feb. 21, 2013; 4 pages.
Notice of Allowance issued in U.S. Appl. No. 13/617,051 on Mar. 19, 2013; 4 pages.
Office Action for corresponding U.S. Appl. No. 10/593,053 dated Dec. 27, 2010; 13 pages.
Office action issued in U.S. Appl. No. 13/619,762 on Oct. 24, 2013, 13 pages.
Office action issued in U.S. Appl. No. 12/806,185 on Nov. 4, 2013, 14 pages.
Office Action issued in Chinese Application No. 200810001919.7 on May 27, 2010; 12 pages.
Office Action issued in Chinese Application No. 200810001919.7 on Dec. 31, 2011; 8 pages.
Office Action issued in Chinese Application No. 200810001919.7 on Sep. 29, 2012; 10 pages.
Office Action issued in Chinese Application No. 200810001919.7 on Nov. 8, 2012; 6 pages.
Communication Pursuant to Article 96(2) EPC issued in European Application No. 02801256.5 on Nov. 21, 2006; 3 pages.
Communication Pursuant to Article 94(3) EPC issued in European Application No. 02801256.5 on Apr. 18, 2008; 3 pages.
Summons to Attend Oral Proceedings Pursuant to Rule 115(1) EPC issued in European Application No. 02801256.5 on Oct. 5, 2009; 3 pages.
Minutes of the Oral Proceedings before the Examining Division and Decision to Refuse a European Patent Application issued in European Application No. 02801256.5 on Feb. 4, 2010; 24 pages.
Summons to Attend Oral Proceedings Pursuant to Rule 115(1) EPC issued in European Application No. 02801256.5 on Mar. 27, 2013; 8 pages.
Extended European Search Report issued in European Application No. 10182868.9 on Sep. 20, 2011; 7 pages.
Communication Pursuant to Article 94(3) EPC issued in European Application No. 10182868.9 on Mar. 18, 2013; 5 pages.
International Search Report issued in International Application No. PCT/CA02/01541 on Jan. 30, 2003; 3 pages.
Written Opinion issued in International Application No. PCT/CA02/01541 on Jun. 16, 2003; 6 pages.
International Preliminary Examination Report issued in International Application No. PCT/CA02/01541 on Sep. 11, 2003; 7 pages.
Office Action issued in Japanese Application No. 2012-518709 on Jan. 21, 2014; 3 pages. No translation.
Office action issued in U.S. Appl. No. 13/619,762 on Jan. 8, 2014, 14 pages.
Extended European Search Report issued in European Application No. 14164460.9 on Jun. 6, 2014.
Office Action issued in Russian Application No. 2012103239 on Apr. 22, 2014; 6 pages.

\* cited by examiner

HANDOVER SCHEMES FOR WIRELESS SYSTEMS

CROSS-REFERENCE TO RELATED APPLICATIONS

This application claims the benefit of U.S. provisional patent application No. 61/078,505 filed Jul. 7, 2008.

MICROFICHE APPENDIX

Not applicable.

TECHNICAL FIELD

This application relates to wireless communication techniques in general, and to technique of the disclosure, in particular.

ART RELATED TO THE APPLICATION

Draft IEEE 802.16m System Description Document, IEEE 802.16m-08/003r1, dated Apr. 15, 2008, it is stated that:
This [802.16m] standard amends the IEEE 802.16 WirelessMAN-OFDMA specification to provide an advanced air interface for operation in licensed bands. It meets the cellular layer requirements of IMT-Advanced next generation mobile networks. This amendment provides continuing support for legacy WirelessMAN-OFDMA equipment.
And the standard will address the following purpose:
  i. The purpose of this standard is to provide performance improvements necessary to support future advanced services and applications, such as those described by the ITU in Report ITU-R M.2072.
FIGS. 7-13 of the present application correspond to FIGS. 1-7 of IEEE 802.16m-08/003r1.

SUMMARY

Aspects and features of the present application will become apparent to those ordinarily skilled in the art upon review of the following description of specific embodiments of a disclosure in conjunction with the accompanying drawing figures and appendices.

BRIEF DESCRIPTION OF THE DRAWINGS

Embodiments of the present application will now be described, by way of example only, with reference to the accompanying drawing figures, wherein.

Like reference numerals are used in different figures to denote similar elements.

DETAILED DESCRIPTION OF THE DRAWINGS

Wireless System Overview

Figure 1:
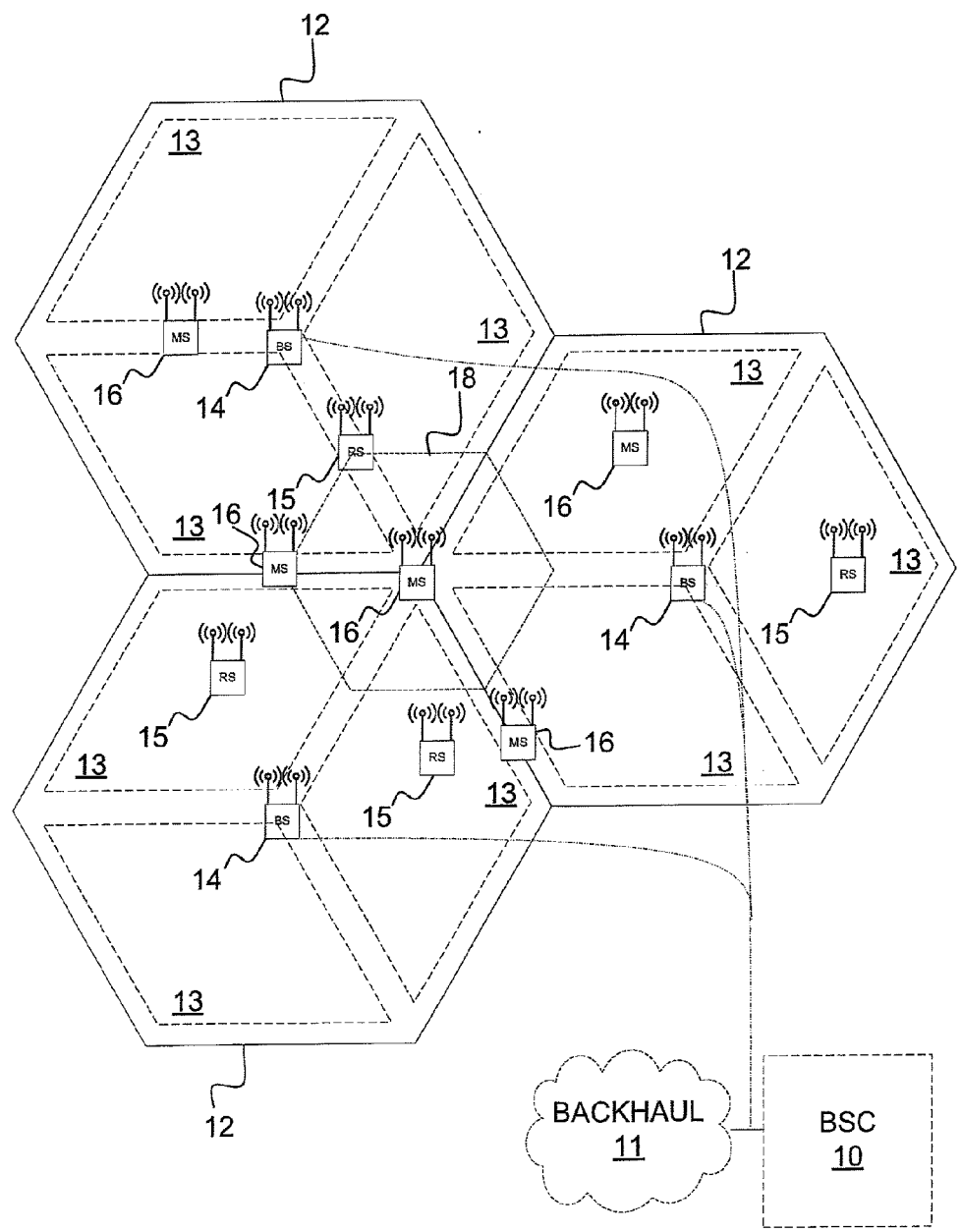
FIG. 1 is a block diagram of a cellular communication system.

Referring to the drawings, FIG. 1 shows a base station controller (BSC) 10 which controls wireless communications within multiple cells 12, which cells are served by corresponding base stations (BS) 14. In some configurations, each cell is further divided into multiple sectors 13 or zones (not shown). In general, each base station 14 facilitates communications using OFDM with mobile and/or wireless terminals 16, which are within the cell 12 associated with the corresponding base station 14. The movement of the mobile terminals 16 in relation to the base stations 14 results in significant fluctuation in channel conditions. As illustrated, the base stations 14 and mobile terminals 16 may include multiple antennas to provide spatial diversity for communications. In some configurations, relay stations 15 may assist in communications between base stations 14 and wireless terminals 16. Wireless terminals 16 can be handed off 18 from any cell 12, sector 13, zone (not shown), base station 14 or relay 15 to an other cell 12, sector 13, zone (not shown), base station 14 or relay 15. In some configurations, base stations 14 communicate with each and with another network (such as a core network or the internet, both not shown) over a backhaul network 11. In some configurations, a base station controller 10 is not needed.

Figure 2:
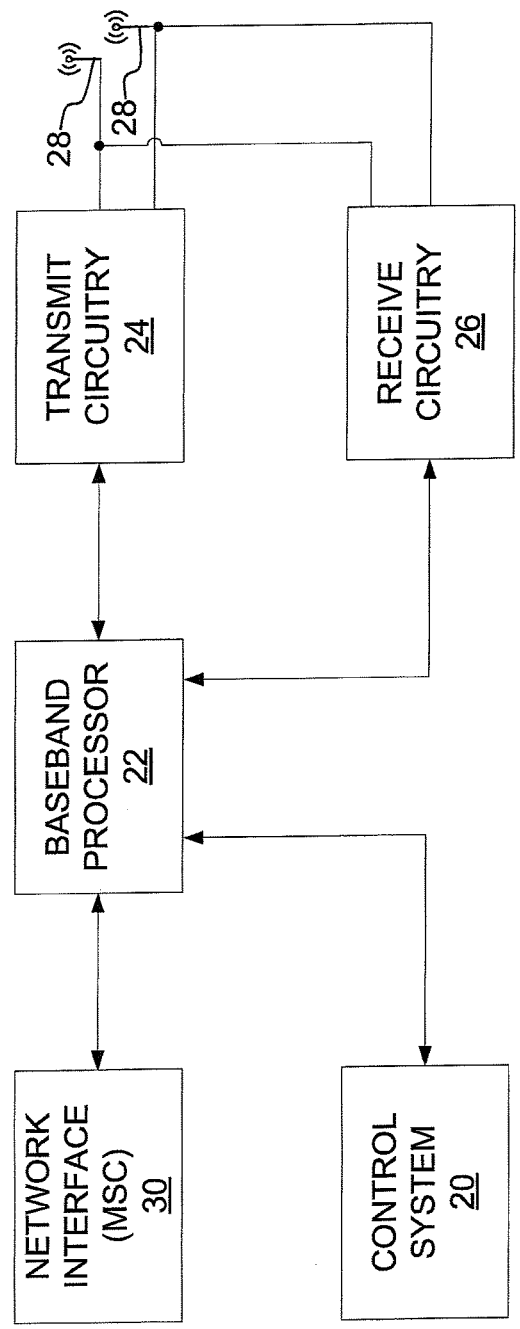
FIG. 2 is a block diagram of an example base station that might be used to implement some embodiments of the present 5 application.

With reference to FIG. 2, an example of a base station 14 is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 3) and relay stations 15 (illustrated in FIG. 4). A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14, either directly or with the assistance of a relay 15.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by one or more carrier signals having a desired transmit frequency or frequencies. A power amplifier (not shown) will amplify the modulated carrier signals to a level appropriate for transmission, and deliver the modulated carrier signals to the antennas 28 through a matching network (not shown). Modulation and processing details are described in greater detail below.

Figure 3:
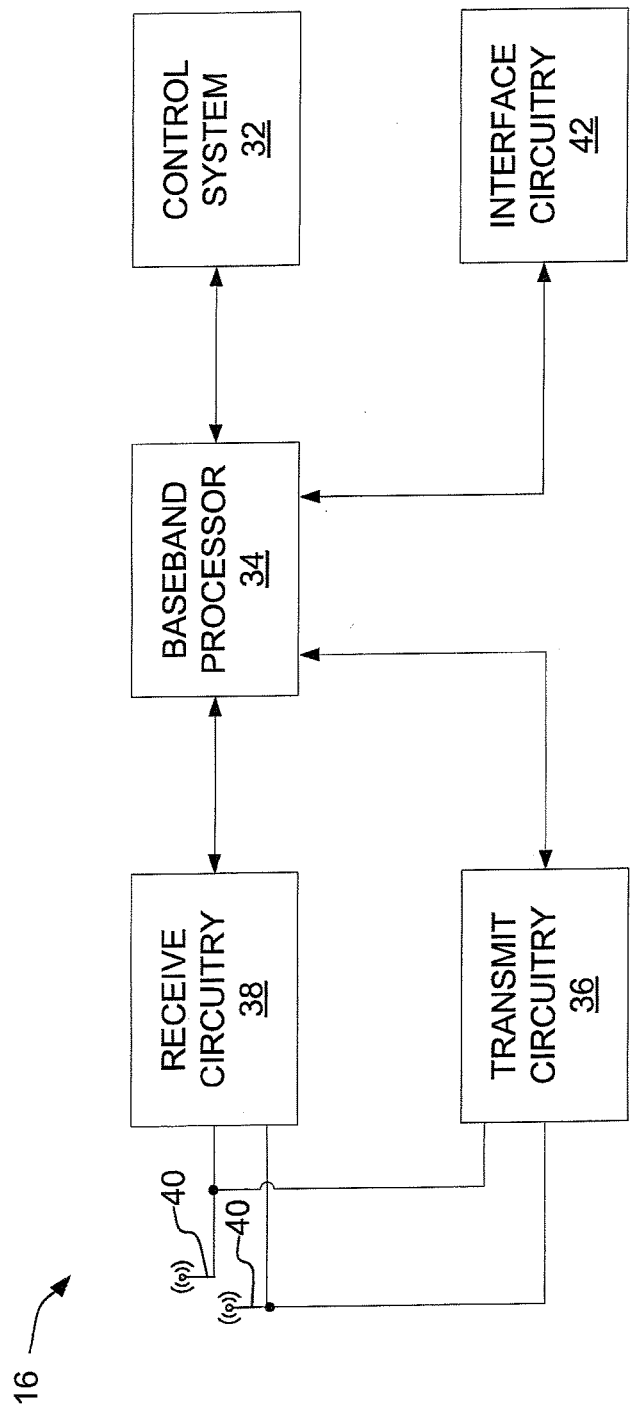
FIG. 3 is a block diagram of an example wireless terminal that might be used to implement some embodiments of the present application.

With reference to FIG. 3, an example of a mobile terminal 16 is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14 and relays 15. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, video, data, or control information, from the control system 32, which it encodes for transmission. The encoded data is output to the transmit circuitry 36, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 40 through a matching network (not shown). Various modulation and processing techniques available to those skilled in the art are used for signal transmission between the mobile terminal and the base station, either directly or via the relay station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is preferably used for at least downlink transmission from the base stations 14 to the mobile terminals 16. Each base station 14 is equipped with "n" transmit antennas 28 (n$>=$1), and each mobile terminal 16 is equipped with "m" receive antennas 40 (m$>=$1). Notably, the respective antennas can be used for reception and transmission using appropriate duplexers or switches and are so labelled only for clarity.

When relay stations 15 are used, OFDM is preferably used for downlink transmission from the base stations 14 to the relays 15 and from relay stations 15 to the mobile terminals 16.

Figure 4:
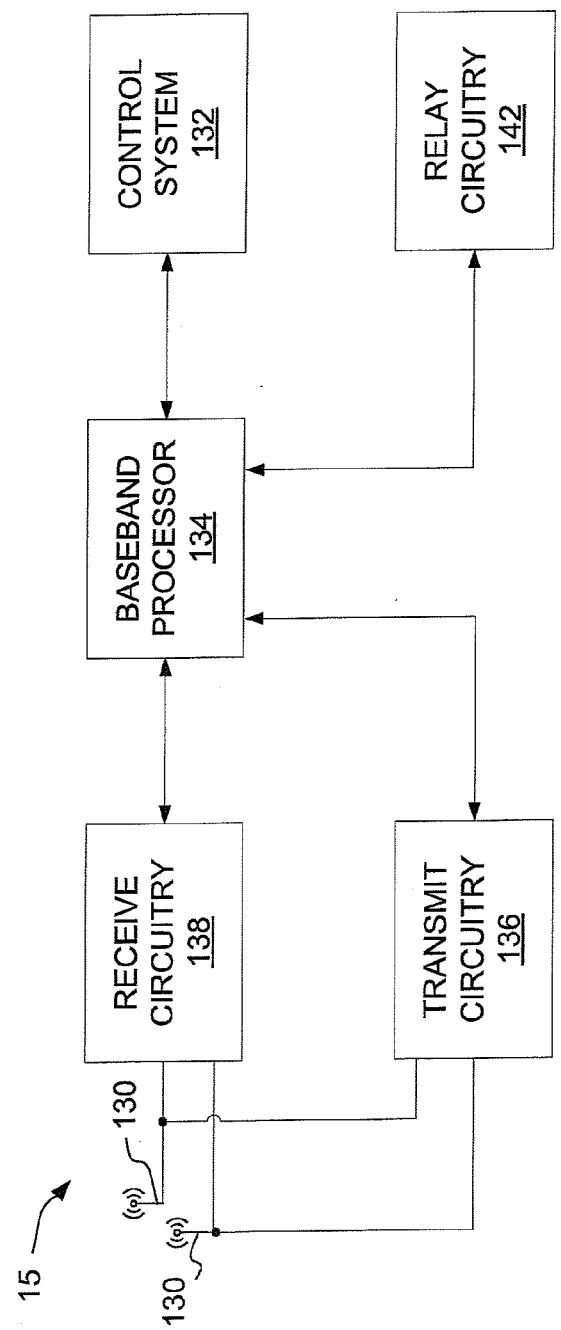
FIG. 4 is a block diagram of an example relay station that might be used to implement some embodiments of the present application.

With reference to FIG. 4, an example of a relay station 15 is illustrated. Similarly to the base station 14, and the mobile terminal 16, the relay station 15 will include a control system 132, a baseband processor 134, transmit circuitry 136, receive circuitry 138, multiple antennas 130, and relay circuitry 142. The relay circuitry 142 enables the relay 14 to assist in communications between a base station 16 and mobile terminals 16. The receive circuitry 138 receives radio frequency signals bearing information from one or more base stations 14 and mobile terminals 16. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 134 processes the digitized received signal to extract the information or data bits conveyed in the received signal. This processing typically comprises demodulation, decoding, and error correction operations. The baseband processor 134 is generally implemented in one or more digital signal processors (DSPs) and application specific integrated circuits (ASICs).

For transmission, the baseband processor 134 receives digitized data, which may represent voice, video, data, or control information, from the control system 132, which it encodes for transmission. The encoded data is output to the transmit circuitry 136, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 130 through a matching network (not shown). Various modulation and processing techniques available to those skilled in the art are used for signal transmission between the mobile terminal and the base station, either directly or indirectly via a relay station, as described above.

Figure 5:
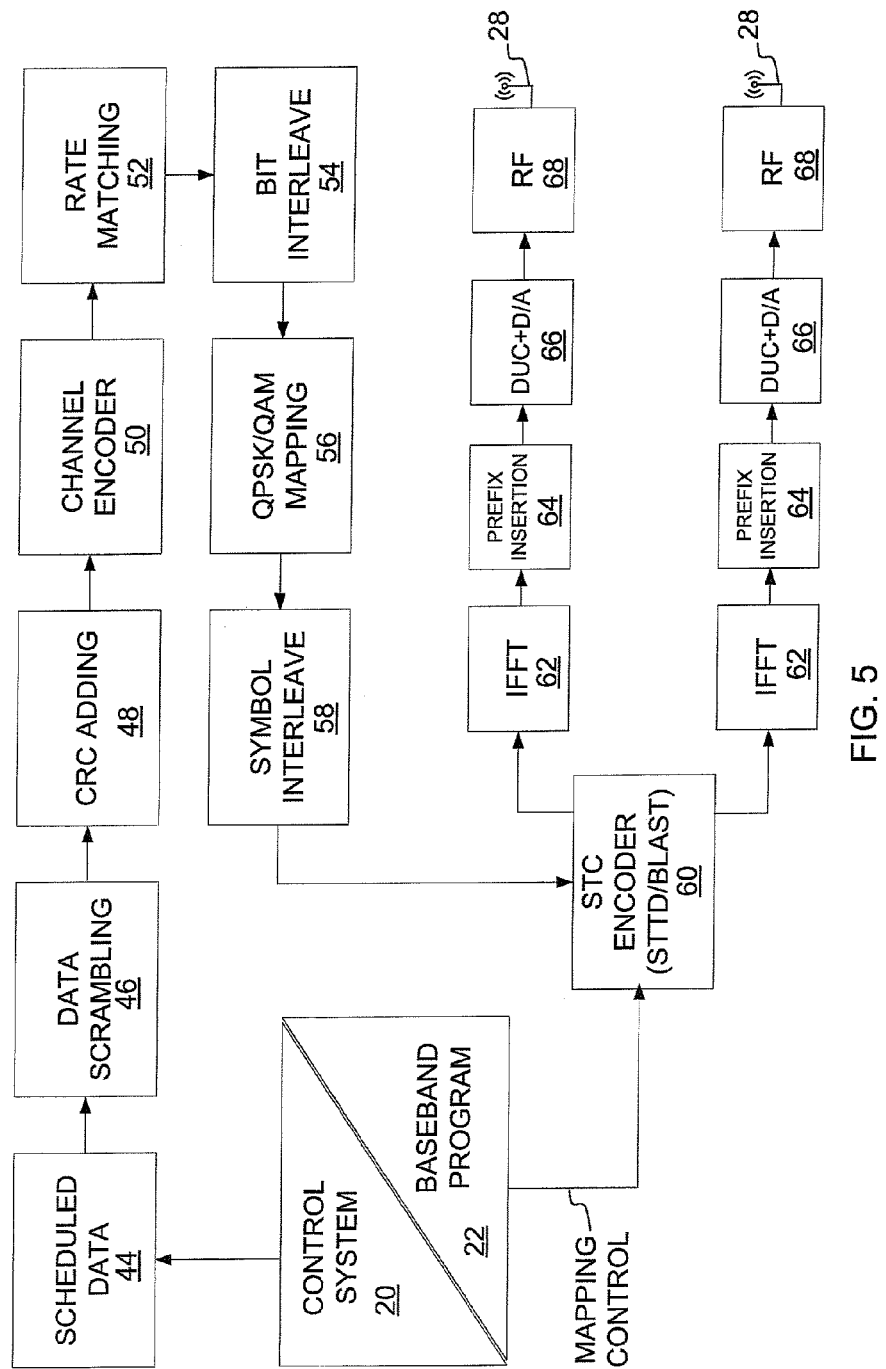
FIG. 5 is a block diagram of a logical breakdown of an example OFDM transmitter architecture that might be used to implement some embodiments of the present application.

With reference to FIG. 5, a logical OFDM transmission architecture will be described. Initially, the base station controller 10 will send data to be transmitted to various mobile terminals 16 to the base station 14, either directly or with the assistance of a relay station 15. The base station 14 may use the channel quality indicators (CQIs) associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22 as described above with respect to FIG. 5 will provide a mapping control signal to control STC encoding. At this point, assume the symbols for the "n" outputs are representative of the data to be transmitted and capable of being recovered by the mobile terminal 16.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 6:
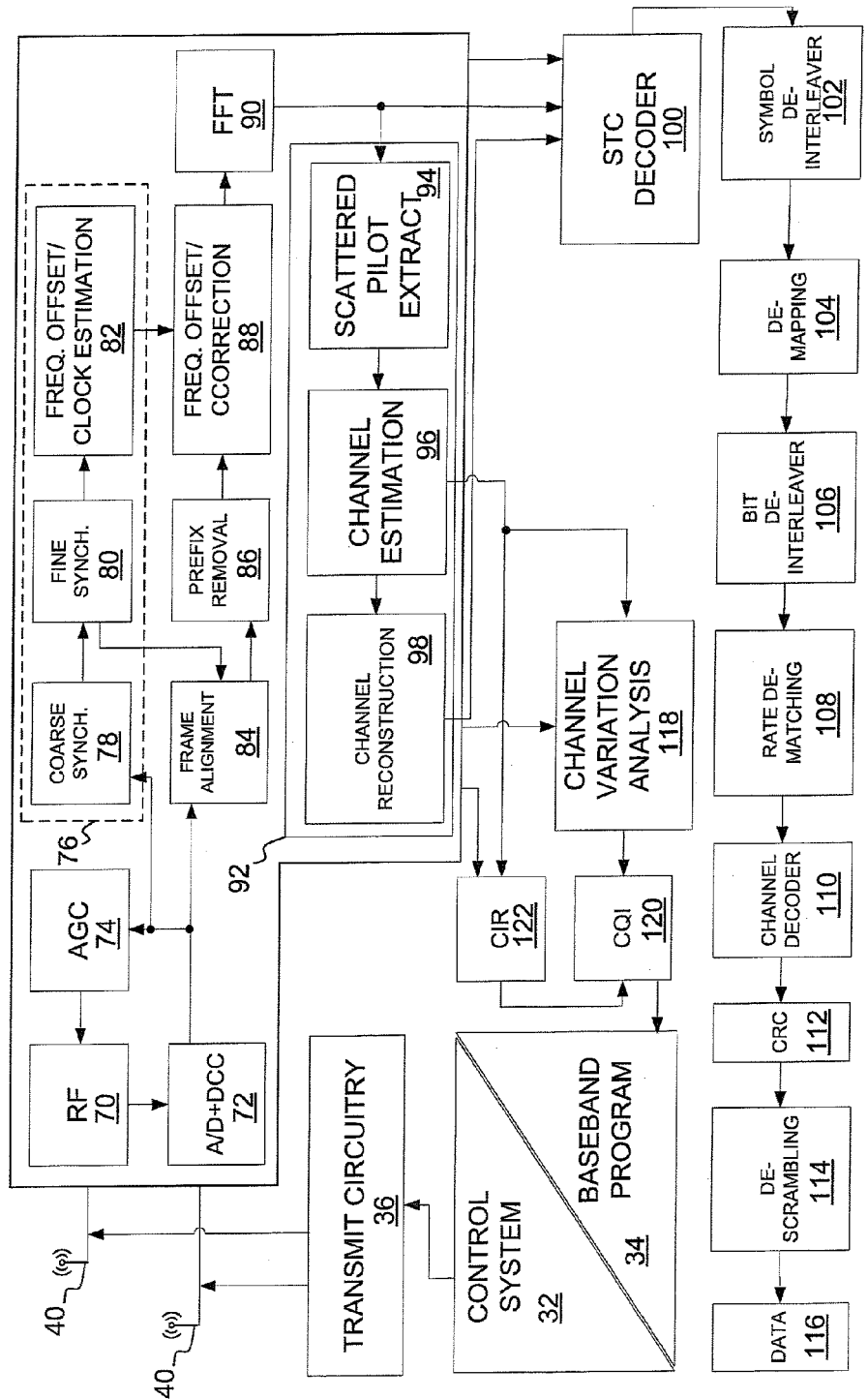
FIG. 6 is a block diagram of a logical breakdown of an example OFDM receiver architecture that might be used to implement some embodiments of the present application.
Figure 7:
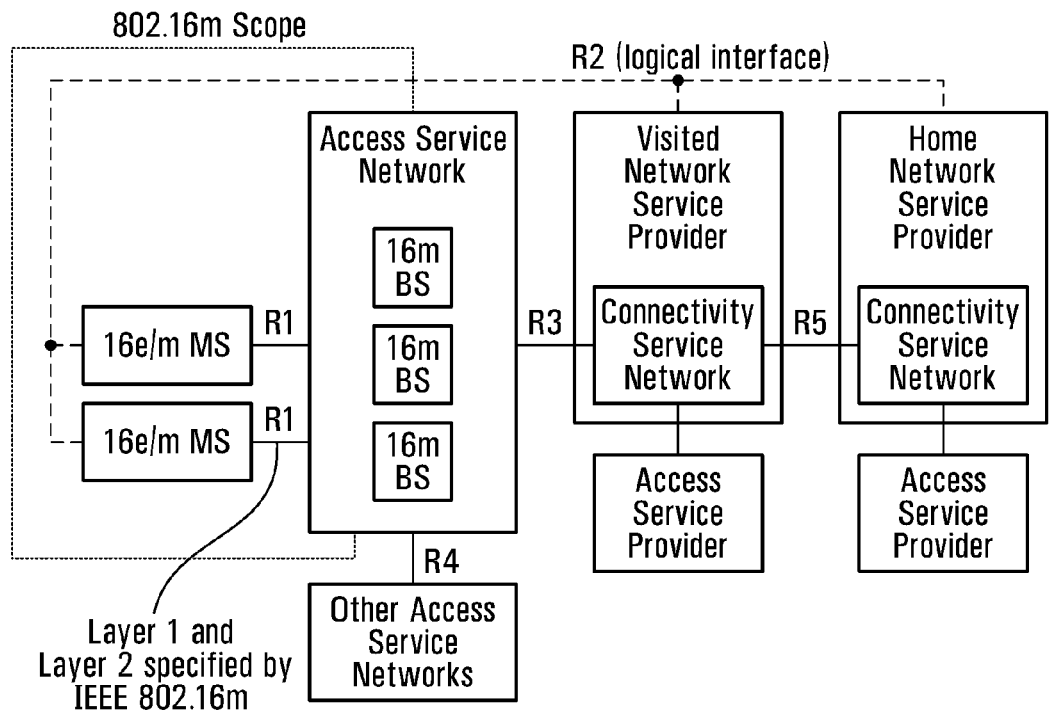
FIG. 7 is FIG. 1 of WEE 802.16m-08/003r1, an Example of overall network architecture.
Figure 8:
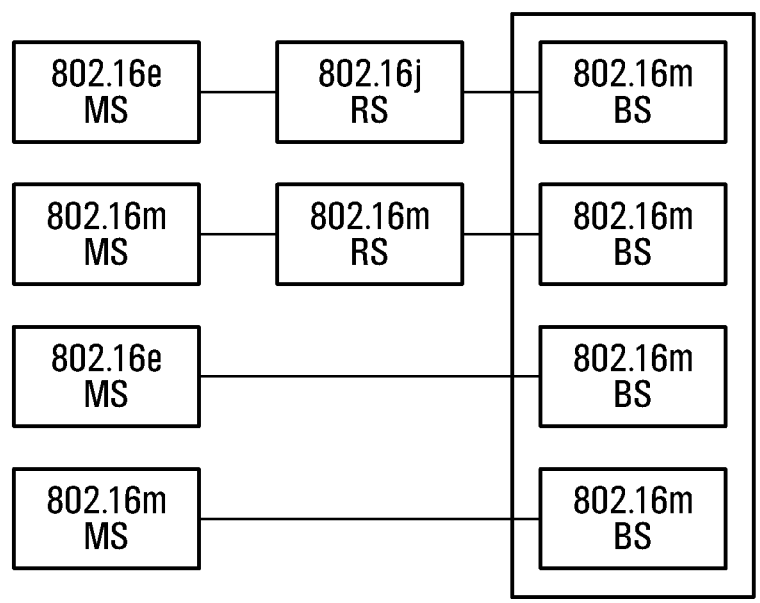
FIG. 8 is FIG. 2 of IEEE 802.16m-08/003r1, a Relay Station in overall network architecture.
Figure 9:
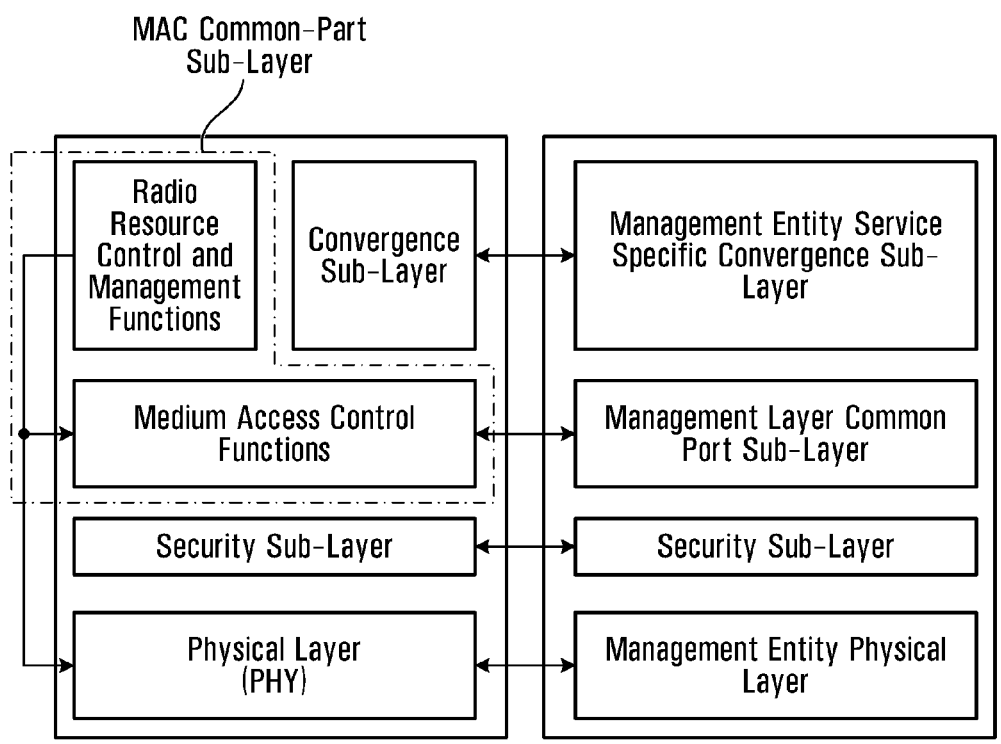
FIG. 9 is FIG. 3 of IEEE 802.16m-08/003r1, a System Reference Model.
Figure 10:
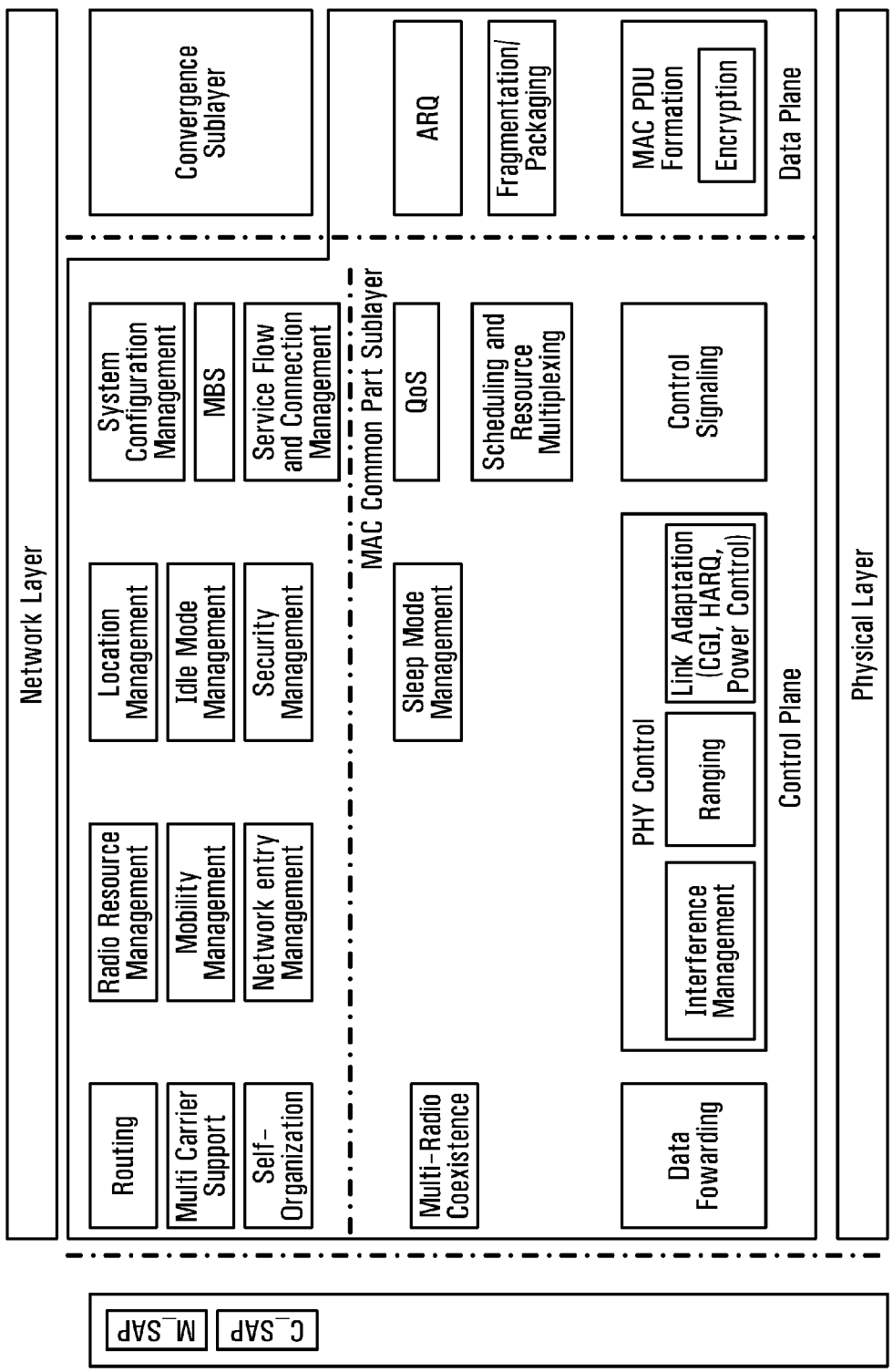
FIG. 10 is FIG. 4 of IEEE 802.16m-08/003r1, The IEEE 802.16m Protocol Structure.
Figure 11:
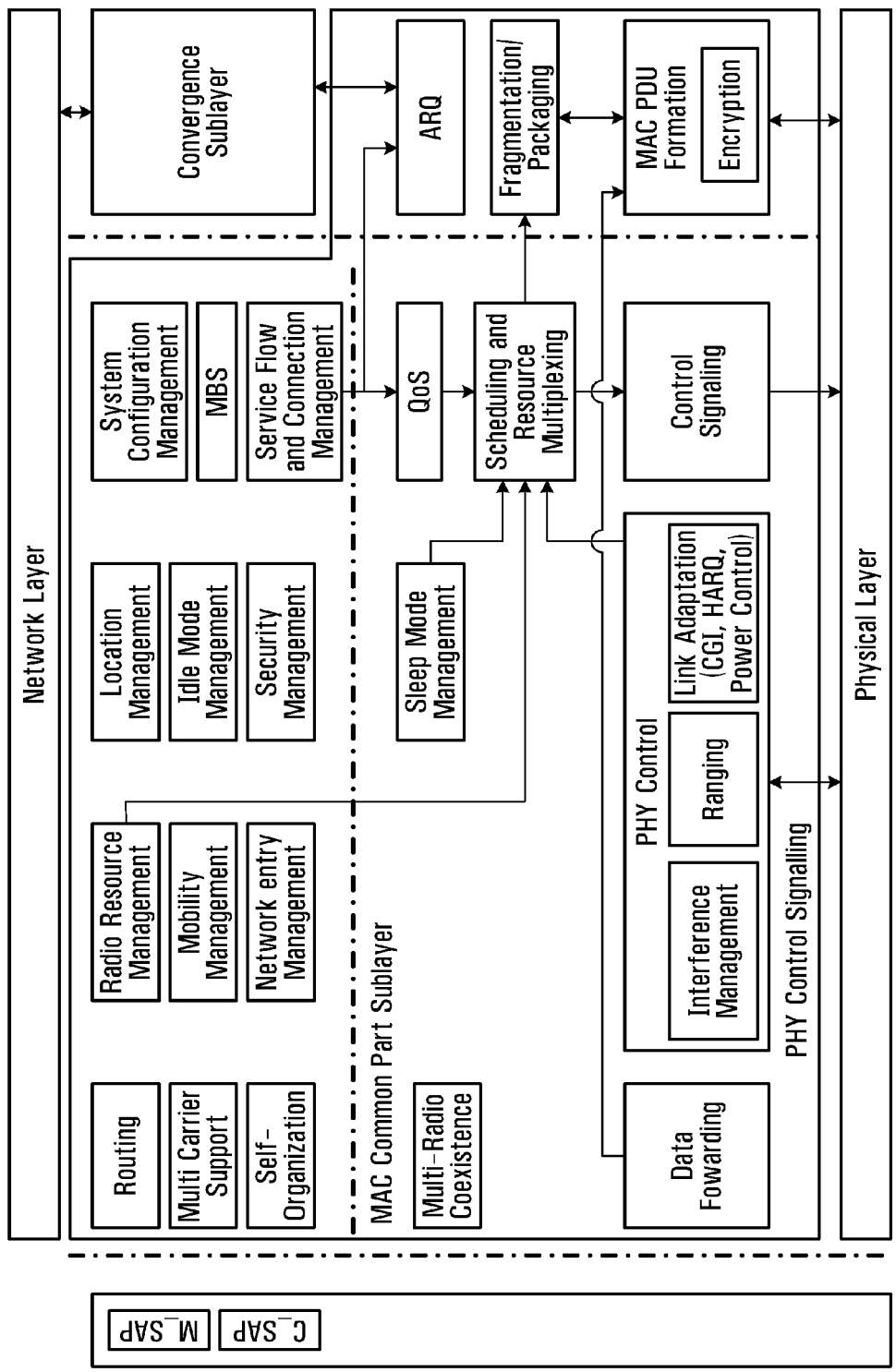
FIG. 11 is FIG. 5 of IEEE 802.16m-08/003r1, The IEEE 802.16m MS/BS Data Plane Processing Flow.
Figure 12:
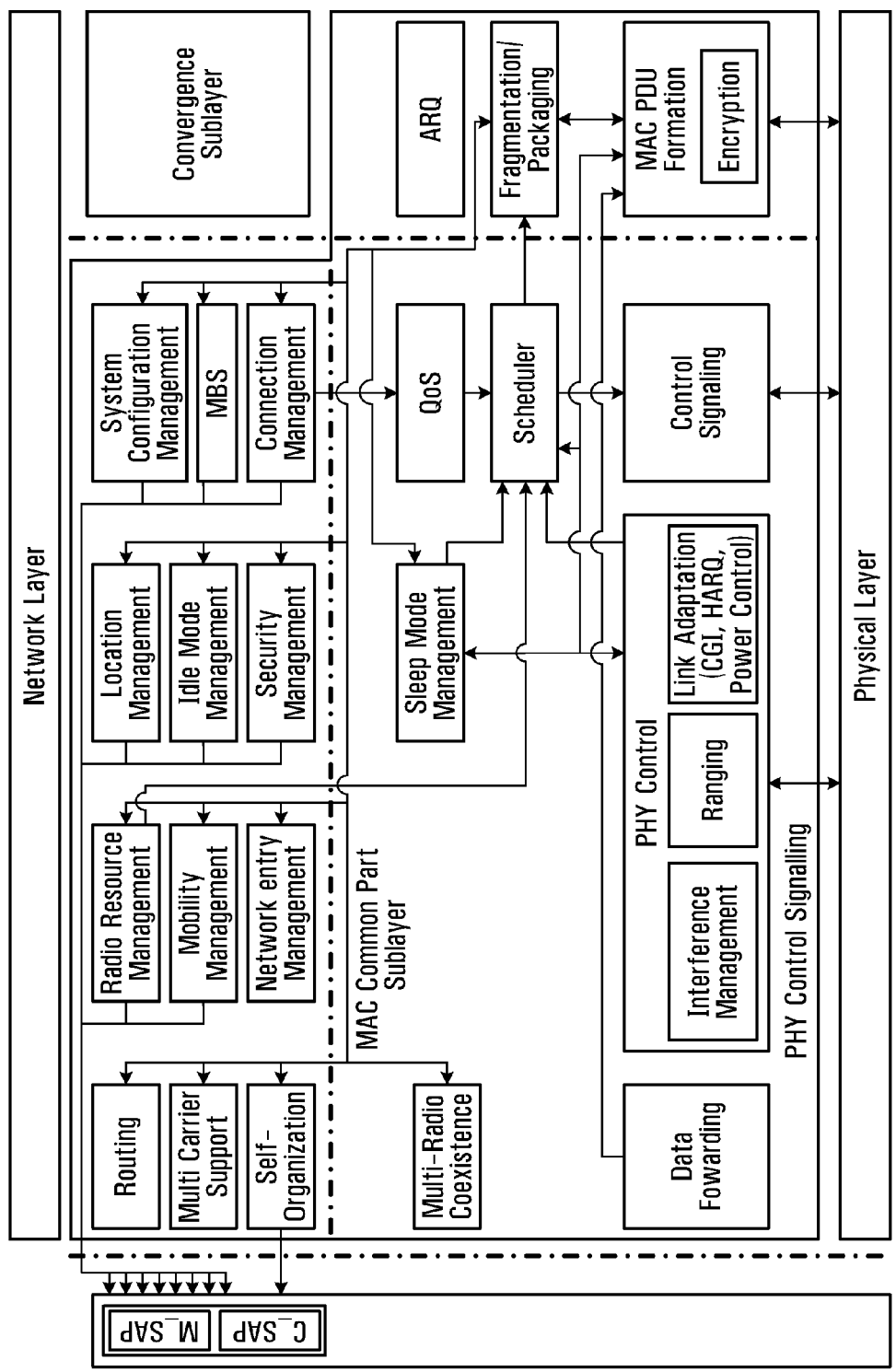
FIG. 12 is FIG. 6 of IEEE 802.16m-08/003r1, The IEEE 802.16m MS/BS Control Plane Processing Flow.
Figure 13:
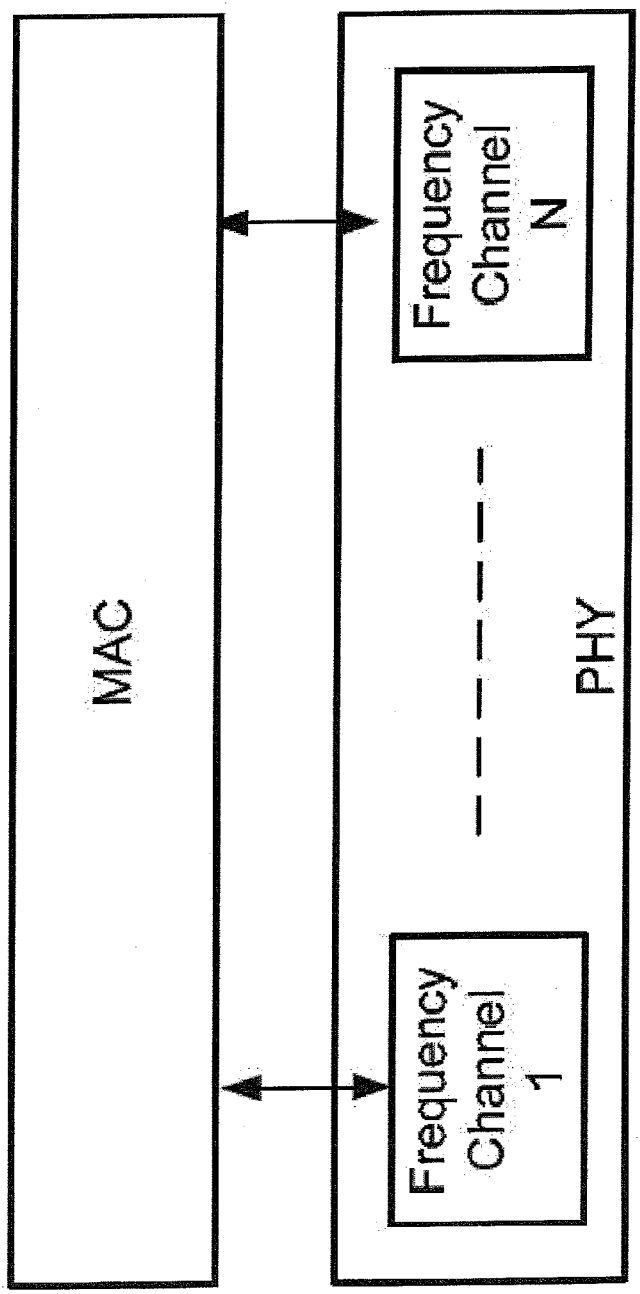
FIG. 13 is FIG. 7 of IEEE 802.16m-08/003r1, Generic protocol architecture to support multicarrier system.

Reference is now made to FIG. 6 to illustrate reception of the transmitted signals by a mobile terminal 16, either directly from base station 14 or with the assistance of relay 15. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an autocorrelation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Continuing with FIG. 6, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

In parallel to recovering the data 116, a CQI, or at least information sufficient to create a CQI at the base station 14, is determined and transmitted to the base station 14. As noted above, the CQI may be a function of the carrier-to-interference ratio (CR), as well as the degree to which the channel response varies across the various sub-carriers in the OFDM frequency band. For this embodiment, the channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

In some embodiments, a relay station may operate in a time division manner using only one radio, or alternatively include multiple radios.

FIGS. 1 to 6 provide one specific example of a communication system that could be used to implement embodiments of the application. It is to be understood that embodiments of the application can be implemented with communications systems having architectures that are different than the specific example, but that operate in a manner consistent with the implementation of the embodiments as described herein.

Overview of Current Draft 802.16M

FIGS. 7-13 of the present application correspond to FIGS. 1-7 of IEEE 802.16m-08/003r1.

The description of these figures in of IEEE 802.16m-08/003r1 is incorporated herein by reference.

Further Details of Present Disclosure

Details of embodiments of the present disclosure are in the attached appendices.

The above-described embodiments of the present application are intended to be examples only. Those of skill in the art may effect alterations, modifications and variations to the particular embodiments without departing from the scope of the application.

Figure 14:
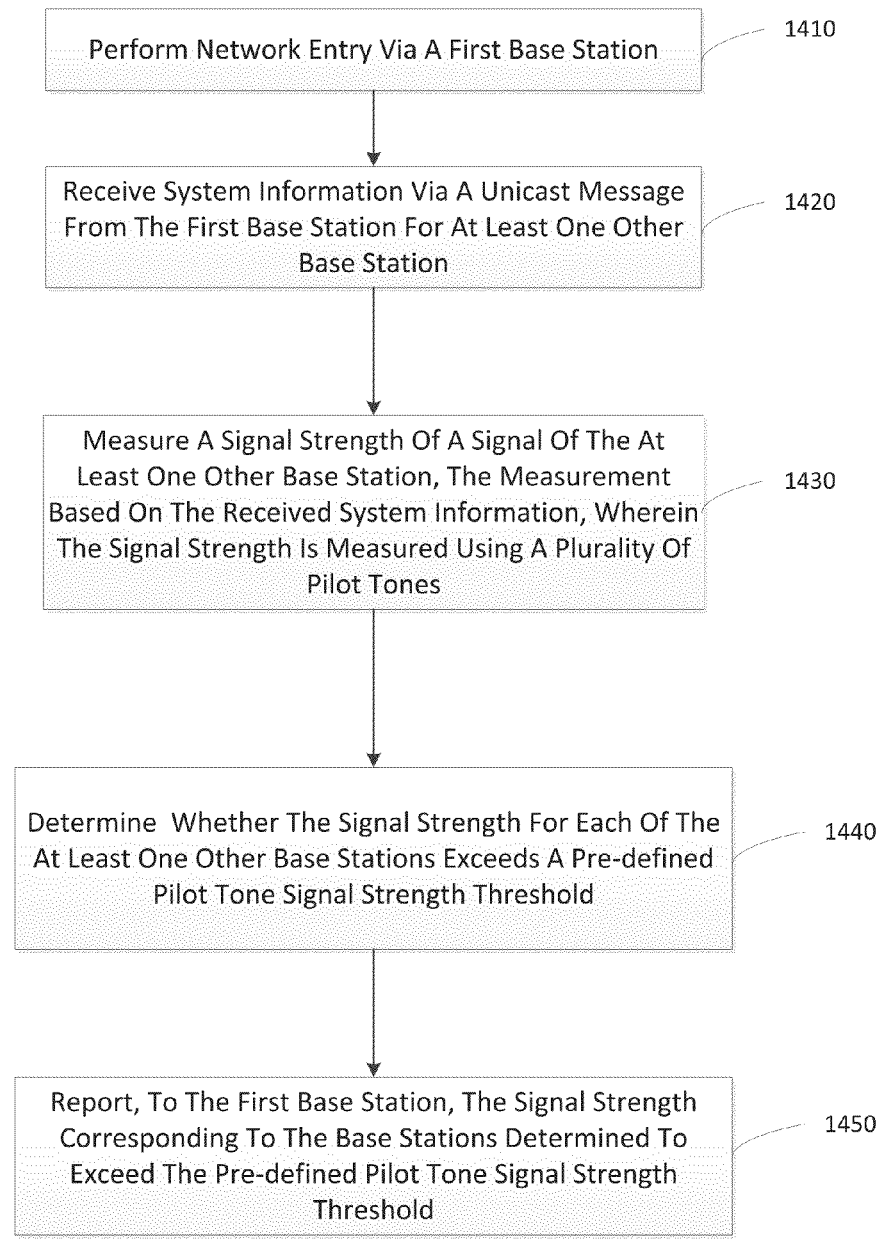
FIG. 14 is a flow chart illustrating an example process performed by a user equipment.

FIG. 14 is a flow chart illustrating an example process 1400 performed by a user equipment (UE), for example, in an orthogonal frequency division multiplexing (OFDM) system. At 1410, network entry is performed by the UE via a first base station. At 1420, system information is received via a unicast message from the first base station for at least one other base station. At 1430, a signal strength of a signal of the at least one other base station is measured by the UE. The measurement can be based on the received system information, wherein the signal strength is measured using a plurality of pilot tones. At 1440, the UE determines whether the signal strength for each of the at least one other base stations exceeds a pre-defined pilot tone signal strength threshold. At 1450, the UE reports, to the first base station, the signal strength corresponding to the base stations determined to exceed the pre-defined pilot tone signal strength threshold.

The application proposes the enhanced handover schemes to reduce handover latency and improve reliability.

To improve the reliability of fast BS switching, the BS may explicitly acknowledge an MS-anchor BS switching request through DL control signaling. To avoid handover ranging (thus reducing handover latency), when an MS hands-over to another BS, a multi-BS ranging mechanism can be used to allow BSs in the MS-active set to perform implicit ranging with the MS and method to compile and convey the ranging information to the MS through the serving BS. To provide distributed control by BSs in the active set, an UL control channel should be decoded by multiple BSs in the active set. A power control scheme can provide reliability of reception of the control channel by all BSs in the active set.

To provide for certain distributed control (e.g. interference control) by BSs in the active set, independent UL control channels can be assigned for the MS to transmit to each BS. A power control scheme can control the transmit power of the MS on each of the UL control channels, for reliable reception by the BSs. To reduce the overhead involved in transmitting neighbor BS system configuration information and also to ensure expedited delivery of such information to MS in cell edge, we propose to first unicast to the MS, the crucial physical layer information required by MS to perform neighbor BS signal strength measurement (e.g. preamble index), after the MS enters the network. While the MS is in connected state, the BS can unicast or multicast a neighbor BS system configuration information to the MS when the neighbor BS is in the active set of a MS.

Two types of handover schemes are described: a soft handover (SHO) to support multi-BS SFN transmission and multi-BS MIMO; and enhanced fast BS switching (FBSS). From the MS perspective, the MS does not need to be aware of whether there is one BS or multiple BSs to/from the MS can transmit/receive traffic. The MS only needs to know the corresponding permutation zone that the BS uses to assign DL/UL resource to the MS. The following operations are the same for both SHO and enhanced FBSS:

Active Set management;
Anchor BS switching;
Exchange DL/uL control information with the Anchor BS.
   An MS may be allocated additional UL control channels for transmission to other non-anchor BS in the active set.

Multi-BS Ranging can include the following features and/or characteristics:

Periodic ranging resource (ranging code and ranging region) is preallocated to the MS by the Anchor BS. The serving BS notifies the neighbor BSs in the active set of the assigned ranging resource to the MS. All BSs in the active set including the neighbor BSs detect the ranging code transmission from the MS. For the case of SHO, BSs within the active set may exchange the ranging detection performance and coordinate the joint ranging adjustment parameters. The Anchor BS transmits the ranging adjustment parameters to the MS through the RNG-RSP message. For the case of enhanced FBSS, neighbor BSs send ranging adjustment parameters to the serving BSs through the backhaul. The Anchor BS transmits the ranging adjustment parameters of the neighbor BSs to the MS via MAC management messages. As the MS keeps track of the updated ranging adjustment parameters from neighbor BSs, when it switches to a target anchor BS, handover ranging is not required.

Anchor BS Switching:

An MS sends an Anchor BS switching request to the current Anchor BS, using the UL fast feedback control channel or as piggy-back lower MAC signaling with data traffic. After sending the Anchor BS switching request, the MS waits for current Anchor BS's response. If no response is received after a configured timeout period, the MS retransmit the Anchor BS switching request. In some implementations, the MS can transmit repeatedly send the Anchor BS switching request to the current Anchor BS before receiving any response from the current Anchor BS. The current Anchor BS acknowledges the reception of the Anchor BS switching request from the MS by transmitting lower MAC signaling (e.g. MAC header) to the MS. The current Anchor BS can approve or reject MS' request. If approved, the following information is included in the lower MAC signaling:

Action time, i.e., when the MS shall switch to the target Anchor BS (this value is determined by the BS based on the required backbone latency to coordinate the context information exchange and data flow synchronization). The action time aligns with the superframe boundary.

Assignment of UL fast feedback control channel and other UL resource for bandwidth request, ARQ sequence number etc., at the target Anchor BS The MS switches to the target Anchor BS at the specified action time. The MS decodes the superframe header of the target Anchor BS. The MS transmits UL fast feedback control information (e.g. CQI etc.) and additional lower MAC signaling (e.g. bandwidth request, ARQ sequence number etc.) on the pre-assigned UL resource on the subframe following the superframe header.

Power Control Scheme:

Open Loop Power Control:

For SHO, there are two options on how the MS measures the DL channel gain and uses it for adjusting UL transmit power:

Option 1: MS measures the DL signal strength through the preamble of each BS in the active set. MS computes the effective composite channel gain using the individual preamble signal strength as input Option 2: MS measures the composite DL signal strength through the composite pilot tones transmitted by BSs in the active set.

For FBSS, the MS measures the DL signal strength on the Anchor BS, either through the preamble or pilot tones of the Anchor BS Closed Loop Power Control:

The MS performs closed loop power control with the Anchor BS on the UL fast feedback control channel. In another embodiment, the MS transmit power of the UL fast feedback control channel is power controlled by all BSs in the active set. In this case, in one embodiment, all BSs in the active set transmits power control commands to the MS. The MS adjust its power up, as long as at least one BS commands the power to go up. If all BS commands the power to go down, then the MS adjust its power down. In another embodiment, the neighbor BSs route the power control commands to the Anchor BS. The Anchor BS combines the commands using a certain rule (can be similar to that described above) and sends the combined command to the MS.

For the case of FBSS, the transmit power of the traffic channel is computed by adjusting the transmit power of the UL fast feedback control channel by a scaling factor that corresponds to the ratio of the required SNR of the UL fast feedback control channel and required SNR of the traffic channel. For the case of SHO, the transmit power of the traffic channel is computed by adjusting the transmit power of the UL fast feedback control channel by a scaling factor that corresponds to 1) the ratio of the required SNR of the UL fast feedback control channel and required SNR of the traffic channel; and 2) a fudge factor that accounts for the macro-diversity gain. In an embodiment, an MS can be assigned additional UL fast feedback control channels to transmit to other BSs in the active set.

In one embodiment, the MS performs open loop power control on each of the allocated UL fast feedback control channel based on the measured DL channel gain of the corresponding neighbor BS. In another embodiment, the MS performs closed loop power control with each of the BSs that has the corresponding UL fast feedback control channel assigned.

Neighbor BS System Configuration Information

Neighbor BS system configuration information (SCI) has multiple purposes: first, it helps an MS to decide whether to add a BS to the active set; it helps an MS to decide which neighbor BSs' preamble to scan to measure signal strength; and it can expedite the handover process since after switching to the target BS, the MS does not have to wait until it successfully decoded the target BS system configuration information The neighbor BS SCI does not have to be broadcast to all MSs in a cell since it is only relevant to MSs in cell edge. The serving BS unicasts the preamble indices of its neighbor BSs to an MS during or after the MS performs network entry procedure. Since this information is static, it doesn't have to be sent to the MS again. When an MS hands over to another BS, the target BS unicasts the preamble indices of its neighbor BSs to the MS.

The following steps are used to provide efficient neighbor BS SCI transmission and active set management:

MS measures the signal strength of neighbor BSs. The MS may use the preamble indices previously sent by the serving BS to expedite the preamble scanning and signal strength measurement procedure.

MS sends neighbor BS signal strength measurement report to the Anchor BS. The signal strength measurement report includes signal strength from neighbor BSs that are higher than a pre-defined threshold.

The Anchor BS responds with the list of neighbor BSs recommended to be in the Active Set There are three options on how the Anchor BS transmits the neighbor BSs SCI to the MS:

Option 1: the Anchor BS unicasts the neighbor BSs SCI to the MS for those neighbor BS within the MS's active set;

Option 2: the Anchor BS multicasts a neighbor BS SCI to a group of MSs whose active set contains the neighbor BS;

Option 3: the Anchor BS broadcasts the neighbor BSs SCI to all MSs in the cell

The BS may choose to use one or multiple of the above options depending on the number users that require the SCI of a particular neighbor BS.

The invention claimed is:

1. A method of a user equipment (UE) in an orthogonal frequency division multiplexing (OFDM) system comprising:

performing network entry via a first base station;
receiving system information via a unicast message from the first base station for at least one other base station, wherein the system information includes a preamble index for each of the at least one other base station, and each of the at least one other base station belongs to an active set of the UE;
measuring, at the UE, a signal strength of a signal of each of the at least one other base station, the measurement based on the received system information, wherein the signal strength is measured using a plurality of OFDM pilot tones, wherein the plurality of OFDM pilot tones are arranged in a scattered pattern in time and frequency;
determining, at the UE, whether the signal strength for each of the at least one other base stations exceeds a pre-defined pilot tone signal strength threshold; and
reporting, from the UE to the first base station, the signal strength corresponding to the base stations determined to exceed the pre-defined pilot tone signal strength threshold.

2. The method of claim 1, further comprising handing over to a second base station, wherein the second base station is one of the at least one other base stations.

3. The method of claim 1, wherein the signal is a preamble.

4. The method of claim 1, wherein the unicast message is received in connected state.

5. The method of claim 1, further comprising reporting the signal strength of each of the at least one other base station to the first base station.

6. The method of claim 1, wherein the system information is received from the first base station via a relay station.

7. A user equipment comprising:
a hardware processor; and
a transceiver, the transceiver configured to communicate with elements of a wireless communications network;
the hardware processor configured to control the transceiver to:
  perform network entry via a first base station;
  receive system information via a unicast message from the first base station for at least one other base station, wherein the system information includes a preamble index for each of the at least one other base station, and each of the at least one other base station belongs to an active set of the user equipment;
  measure a signal strength of a signal of the at least one other base station, the measurement based on the received system information, wherein the signal strength is measured using a plurality of orthogonal frequency division multiplexing (OFDM) pilot tones, wherein the OFDM pilot tones are arranged in a scattered pattern in time and frequency;
  determine whether the signal strength for each of the at least one other base stations exceeds a pre-defined pilot tone signal strength threshold; and
  report, to the first base station, the signal strength corresponding to the base stations determined to exceed the pre-defined pilot tone signal strength.

8. The user equipment of claim 7, further configured to hand over to a second base station, wherein the second base station is one of the at least one other base stations.

9. The user equipment of claim 7, wherein the signal is a preamble.

10. The user equipment of claim 7, wherein the unicast message is received in connected state.

11. The user equipment of claim 7, further configured to report the signal strength of each of the at least one other base station to the first base station.

12. The user equipment of claim 7, wherein the system information is received from the first base station via a relay station.

13. A non-transitory machine-readable medium with a set of instructions stored thereon, which when executed, cause a processor of a user equipment (UE) in an orthogonal frequency division multiplexing (OFDM) system to perform operations comprising:
performing network entry via a first base station;
receiving system information via a unicast message from the first base station for at least one other base station, wherein the system information includes a preamble index for each of the at least one other base station, and each of the at least one other base station belongs to an active set of the UE;
measuring a signal strength of a signal of each of the at least one other base station, the measurement based on the received system information, wherein the signal strength is measured using a plurality of OFDM pilot tones, wherein the plurality of OFDM pilot tones are arranged in a scattered pattern in time and frequency;
determining whether the signal strength for each of the at least one other base stations exceeds a pre-defined pilot tone signal strength threshold; and
reporting, to the first base station, the signal strength corresponding to the base stations determined to exceed the pre-defined pilot tone signal strength threshold.

14. The non-transitory machine-readable medium of claim 13, the operations further comprising handing over to a second base station, wherein the second base station is one of the at least one other base stations.

15. The non-transitory machine-readable medium of claim 13, wherein the signal is a preamble.

16. The non-transitory machine-readable medium of claim 13, wherein the unicast message is received in connected state.

17. The non-transitory machine-readable medium of claim 13, the operations further comprising reporting the signal strength of each of the at least one other base station to the first base station.

18. The non-transitory machine-readable medium of claim 13, wherein the system information is received from the first base station via a relay station.

* * * * *